3,816,471
SALTS OF ASPARTIC ANHYDRIDE WITH MONO-ESTERS OF SULFURIC ACID AND METHOD OF PREPARING THE SAME

Yasuo Ariyoshi, Kanagawa-ken, Yohko Koguchi, Tokyo, and Tetsuo Yamatani and Koji Toi, Kanagawa-ken, Japan, assignors to Ajinomoto Co., Inc., Tokyo, Japan
Claims priority, application Japan, July 8, 1971, 46/50,556
No Drawing. Filed July 5, 1972, Ser. No. 269,043
Int. Cl. C07c 57/14
U.S. Cl. 260—346.8                    9 Claims

ABSTRACT OF THE DISCLOSURE

Crystalline salts of aspartic anhydride with monoesters of sulfuric acid are prepared by reacting alcohols or phenols under anhydrous conditions with an intermediate mixed anhydride of aspartic, sulfuric and acetic acid obtained by reacting aspartic acid sulfate with acetic anhydride or by reacting aspartic acid with a mixture of acetic anhydride and sulfuric acid.

---

This invention relates to salts of aspartic anhydride with monoesters of sulfuric acid and to a method of preparing the salts.

As is being disclosed in greater detail in the commonly owned, simultaneously filed application of Yasuo Ariyoshi et al., Ser. No. 269,044, the salts of L-aspartic anhydride with monoesters of sulfuric acid readily react with lower-alkyl esters of L-phenylalanine to form the corresponding α-L-aspartyl-L-phenylalanine esters which are known sweetening agents.

Salts of aspartic anhydride have been prepared heretofore by reacting aspartic acid with inorganic dehydrating agents in a strongly acid medium (Pat. No. 3,462,460). The known procedures are complex, and aspartic anhydride hydrobromide is the only salt of aspartic anhydride that was available in crystalline form heretofore. The amorphous or oily salts produced with other acids are sufficiently contaminated with free acid to make a peptide synthesis difficult.

It has now been found that the salts of aspartic anhydride with monoesters of sulfuric acid are readily prepared in crystalline form from an unstable intermediate anhydride believed to have the formula

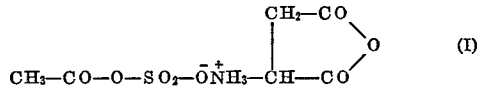

(I)

and formed from aspartic acid sulfate and acetic anhydride or from aspartic acid and a mixture of acetic anhydride and sulfuric acid.

The mixed anhydride of acetic, sulfuric, and aspartic acid represented by the above formula reacts with any organic compound having an available hydroxyl group under anhydrous conditions to form a salt of aspartic anhydride with a monoester of sulfuric acid including the characteristic group

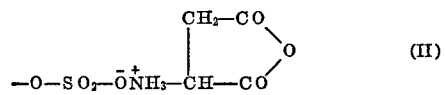

(II)

If the source of the hydroxyl group is methanol, ethanol, propanol, isopropanol, 2,3-dibromopropanol, butanol, secondary butanol, allyl alcohol or one of their higher homologs, the corresponding alkyl or alkenyl monoesters and their substitution products are obtained. Cyclohexanol or cyclopentanol form esters of alicyclic alcohols. Aralkyl and aralkenyl groups may be derived from benzyl alcohol and cinnamyl alcohol, but the reacting hydroxyl group need not be bound to aliphatic or cycloaliphatic carbon. Phenol, p-chlorophenol, and the alkylphenols are effective, and sources of reactive hydroxyl groups containing up to nine carbon atoms will be referred to hereinbelow by way of example.

In preparing the intermediate of Formula (I) from aspartic acid or aspartic acid sulfate, the mole ratio of acetic anhydride to aspartic acid or aspartic acid sulfate should be at least 2:1. A slight excess of acetic anhydride is usually beneficial, but nothing is gained by a large excess of the anhydride although it does not normally have a harmful effect. If free aspartic acid is the starting material, the preparation of the intermediate of Formula (I) requires the presence of at least one mole sulfuric acid per mole of aspartic acid, a slight excess of sulphuric acid being generally advantageous. If aspartic acid sulfate is to be employed as the starting material, it may be added to the reaction mixture as a solid, or it may be formed in a liquid reaction medium from substantially equimolecular amounts of sulfuric acid and aspartic acid.

The dehydration reaction leading to the intermediate occurs spontaneously when the reactants are held in mixture at ambient temperature, and the reaction rate is increased by heating. While the reaction temperature is not critical, it is most convenient to perform the dehydration step at ambient or moderately elevated temperature, that is, about 15° to 70° C.

The second step, in which acetic acid is split off and replaced by the radical of an alcohol or phenol, is exothermic, and it is inconvenient to control the reaction if it is performed at temperatures higher than 50° C. The preferred reaction temperature in the second step is 30° C. or lower.

Solvents are not required in either step, but are preferably employed for better control of the reaction and easier recovery of the ultimate product. Any solvent which is a liquid at the reaction temperature and inert to the starting materials, intermediates, and products may be employed. Carboxylic acids (acetic acid, propionic acid), esters (ethyl or methyl acetate), halogenated hydrocarbons (chloroform, ethylene dichloride), ethers (tetrahydrofuran, dioxane), hydrocarbons (benzene, cyclohexane), and γ-butyrolactone have been employed successfully.

The intermediate of Formula (I) is not isolated, and the same solvent is preferably employed in both steps of the method. If it is suitably chosen, the desired salt of aspartic anhydride with a monoester of sulfuric acid crystallizes in pure form from the reaction mixture.

The following examples are further illustrative of the invention.

EXAMPLE 1

52.5 ml. concentrated sulfuric acid were added dropwise and with stirring to 60 g. L-aspartic acid dispersed in 200 ml. ethyl acetate at ambient temperature, and stirring was continued for two days. L-Aspartic acid sulfate having the formula $C_4H_7O_4N \cdot H_2SO_4$ precipitated in crystalline form. The crystals were filtered off, washed with ethyl acetate, and dried over phosphorus pentoxide. They melted at 151.2° to 152.0° C., weighed 99.0 g. (95% yield) and were identified by elementary analysis and IR spectrum.

Calculated (percent): C, 20.78; H, 3.80; N, 6.06; S, 13.85. Found (percent): C, 20.59; H, 3.87; N, 6.00; S, 13.71.

EXAMPLE 2

11.55 g. L-aspartic acid sulfate prepared as in Example 1, 12.8 g. acetic anhydride, and 0.5 g. concentrated sulfuric acid were added to 10 ml. ethyl acetate, and the reaction mixture was stirred at room temperature for four hours. The solution so obtained was cooled in an ice bath, and 24 ml. anhydrous methanol was added dropwise with stirring. After a few minutes of continued stirring, a crystalline precipitate started forming. The crystals were recovered by filtration, washed with ethyl acetate, and dried over phosphorus pentoxide. They weighed 10.5 g. (92.5% yield). They were identified as the monomethyl sulfate of L-aspartic anhydride by elementary analysis and IR spectrum. The crystals showed partial melting at 96° C., and fully melted at 105° to 109° C.

Calculated for $CH_3OSO_3H \cdot C_4H_5O_3N$ (percent): C, 26.43; H, 3.96; N, 6.17; S, 14.10. Found (percent): C, 26.13; H, 4.24; N, 6.13; S, 13.91.

EXAMPLE 3

A reaction mixture of aspartic acid sulfate, acetic anhydride, sulfuric acid, and ethyl acetate was prepared as in Example 2 and cooled with ice while 4.6 ml. isopropanol was added drop by drop with stirring and continued cooling. Crystals of the monoisopropyl sulfate of L-aspartic anhydride were precipitated thereby, were recovered as described in Example 2, and weighed 10.5 g. (82.4% yield). They were identified by elementary analysis and IR spectrum and melted at 98.0° to 101.5° C.

Calculated for $(CH_3)_2CHOSO_3H \cdot C_4H_5O_3N$ (percent): N, 5.49; S, 12.55. Found (percent): N, 5.36; S, 12.70.

EXAMPLE 4

The procedure of Example 2 was repeated to the formation of the intermediate anhydride of Formula (I), and 6.2 ml. benzyl alcohol was added dropwise to the cold anhydride solution with stirring. Upon addition of 45 ml. anhydrous ether, crystals of the monobenzyl sulfate of L-aspartic anhydride precipitated. They were filtered off, washed with ethyl acetate, and dried over phosphorus pentoxide. They weighed 7.65 g. (50.5% yield) and were identified by elementary analysis and IR spectrum. They melted partly at 78.5° C., and fully at 88° C.

Calculated for $C_6H_5CH_2OSO_3H \cdot C_4H_5O_3N$ (percent): N, 4.62; S, 10.56. Found (percent): N, 4.62; S, 10.71.

EXAMPLE 5

An anhydride solution was prepared as in the preceding Examples. It was further diluted with 20 ml. ethyl acetate and cooled with ice before 5.65 g. phenol were added dropwise with stirring. The precipitated crystals were filtered off, washed with ethyl acetate and dried over phosphorus pentoxide. The dried crystals weighed 11.2 g. (77.5% yield), melted partly at 55° C. and fully at 78°–82° C., and were identified as the monophenyl sulfate of L-aspartic anhydride by infrared spectrum and elementary analysis.

Calculated for $C_6H_5OSO_3H \cdot C_4H_5O_3N$ (percent): N, 4.84; S, 11.07. Found (percent): N, 4.74; S, 11.23.

EXAMPLE 6

In the otherwise unchanged procedure of Example 5, 6.3 ml. cyclohexanol was substituted for the phenol. The monocyclohexyl sulfate of L-aspartic anhydride was recovered in an amount of 13.2 g. (89.5% yield) and melted partly at 67°, and completely at 95°–100° C. It was identified by infrared spectrum and elementary analysis.

Calculated for $C_5H_{11}OSO_3H \cdot C_4H_5O_3N$ (percent): N, 4.75; S, 10.85. Found (percent): N, 4.80; S, 10.84.

EXAMPLE 7

1.1 ml. concentrated sulfuric acid, 4.85 g. acetic anhydride, and 6 ml. ethyl acetate were stirred for 40 minutes. Thereafter, 2.66 g. L-aspartic acid was added, and stirring was continued for two hours, whereupon 0.64 g. anhydrous methanol was added to precipitate crystals of the monomethyl sulfate of L-aspartic anhydride. They weighed 3.86 g. (62.3% yield) and were identical with the product of Example 2.

Analogous crystalline salts of L-aspartic anhydride were obtained from ethanol, propanol, normal and secondary butanol, allyl alcohol, and 2,3-dibromopropanol in the manner of Examples 2 or 7. Cyclopentanol and p-chlorophenol were employed as in Examples 5 and 6 to produce the expected salts of L-aspartic acid with monoesters of sulfuric acid. The several monoester salts were substantially equally useful in the preparation of α-L-aspartyl-L-phenylalanine esters.

Other useful salts of aspartic anhydride with monoesters of sulfuric acid have been prepared in the manner of Examples 2 to 7 from normal and iso amyl alcohol, hexanol, heptanol, octanol, nonanol, p-nitrophenol and furfuryl alcohol.

While the invention has been described with particular reference to specific embodiments, it is to be understood that it is not limited thereto, but is to be construed broadly and restricted solely by the scope of the appended claims.

What is claimed is:

1. A method of preparing a salt of aspartic anhydride with a mono-ester of sulfuric acid which comprises:
    (a) reacting an aliphatic, alicyclic, or arylaliphatic alcohol, furfuryl alcohol, or a phenol with a mixed anhydride of substantially equimolecular amounts of aspartic, acetic, and sulfuric acid in a liquid medium under anhydrous conditions at a temperature not higher than 50° C. until said salt is formed,
        (1) said alcohol or phenol having up to nine carbon atoms, and an available hydroxyl group; and
    (b) recovering said salt from the reaction mixture in crystalline form.

2. A method as set forth in claim 6, wherein said medium includes an organic solvent inert to said mixed anhydride, to said alcohol or phenol, and to said salt.

3. A method as set forth in claim 6, wherein said mixed anhydride is formed prior to said reacting by holding at least two moles of acetic anhydride in mixture with one mole of aspartic acid and at least one mole of sulfuric acid.

4. A method as set forth in claim 6, wherein said mixed anhydride is formed prior to said reacting by holding at least two moles of acetic anhydride in mixture with one mole of aspartic acid sulfate.

5. A method as set forth in claim 6, wherein the amount of said alcohol or phenol is approximately one mole per mole of aspartic anhydride.

6. A method as set forth in claim 1, wherein said alcohol or phenol is methanol.

7. A crystalline salt of aspartic anhydride with a mono-ester of sulfuric acid with an aliphatic, alicyclic, or arylaliphatic alcohol or of a phenol, said alcohol or phenol having up to nine carbon atoms.

8. A salt as set forth in claim 7, wherein said monoester is methyl sulfate.

9. A salt as set forth in claim 8, wherein said aspartic anhydride is in the optically active L-form.

References Cited

UNITED STATES PATENTS 3,462,460    8/1969    Kollonitsch _____ 260—345.9

HENRY R. JILES, Primary Examiner

B. DENTZ, Assistant Examiner

U.S. Cl. X.R.

260—112.5, 240 K, 457, 459